United States Patent
Bos et al.

(10) Patent No.: US 10,841,979 B2
(45) Date of Patent: Nov. 17, 2020

(54) TELECOMMUNICATION SYSTEM WITH PACKET-SWITCHED-MULTIMEDIA-SESSION-TO-CIRCUIT-SWITCHED-CALL TRANSFERRAL

(75) Inventors: Lieve Maria Marcella Rosemarijn Bos, Vlimmeren (BE); Laurent Jean Andre Thiebaut, Antony (FR); Piotr Jan Wencel, Jaroszowiec (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 12/795,532

(22) Filed: Jun. 7, 2010

(65) Prior Publication Data

US 2010/0246573 A1 Sep. 30, 2010

Related U.S. Application Data

(63) Continuation of application No. 10/449,666, filed on Jun. 2, 2003, now Pat. No. 7,751,415.

(30) Foreign Application Priority Data

Jun. 3, 2002 (EP) ..................................... 02291352

(51) Int. Cl.
*H04W 88/16* (2009.01)
*H04M 3/58* (2006.01)
(Continued)

(52) U.S. Cl.
CPC ........... *H04W 88/16* (2013.01); *H04L 65/103* (2013.01); *H04L 65/104* (2013.01);
(Continued)

(58) Field of Classification Search
CPC ................. H04L 12/66; H04L 12/1818; H04L 21/234327; H04L 29/06027; H04L 65/104;
(Continued)

(56) References Cited

U.S. PATENT DOCUMENTS 6,046,762 A * 4/2000 Sonesh et al. ............. 348/14.11
6,917,613 B1 * 7/2005 Tiburtius .......... H04L 29/06027
370/353
(Continued)

FOREIGN PATENT DOCUMENTS

EP    1 182 900 A1    2/2002
WO    9928827 A1    6/1999
(Continued)

OTHER PUBLICATIONS

Paul A. Pangalos, Konstantinos Boukis, Louise Burness, Alan Brookland, Caroling Beauchamps, A.H., Aghvami: "End-to-End sip based real time application adaptation during unplanned vertical handovers" Golbecomm 2001 IEEE, vol. 5, 2001, pp. 3488-3493, XP000864165.
(Continued)

*Primary Examiner* — Jung H Park
(74) *Attorney, Agent, or Firm* — Chiesa Shahinian & Giantomasi PC (57) ABSTRACT

Telecommunication systems with packet-switched multimedia terminals and nodes for packet-switched multimedia sessions and with servers for exchanging multimedia signaling information for the packet-switched multimedia sessions and with terminating units are provided with gateways for in response to transferral messages originating from the packet-switched multimedia terminals and arriving at the servers transferring packet-switched multimedia sessions between packet-switched multimedia terminals and nodes to circuit-switched calls between gateways and circuit-switched terminals via switches, to continue possibly interrupted sessions via replacing calls. The servers send invitation messages to gateways, which send setup messages to switches for setting up circuit-switched calls via partly alternative communication paths. The servers send information messages to terminating units for bringing the termi-
(Continued)

nating units from session level to call level. Preferably, a packet-switched multimedia terminal and a circuit-switched terminal are one and the same terminal.

16 Claims, 2 Drawing Sheets

(51) Int. Cl.
  *H04L 29/06*    (2006.01)
  *H04W 88/18*    (2009.01)
  *H04W 92/02*    (2009.01)
(52) U.S. Cl.
  CPC ...... *H04L 65/1006* (2013.01); *H04L 65/1069* (2013.01); *H04M 3/58* (2013.01); *H04L 65/1016* (2013.01); *H04W 88/18* (2013.01); *H04W 92/02* (2013.01)
(58) Field of Classification Search
  CPC ....... H04L 12/26; H04M 3/42; H04M 7/1245; H04N 7/18; H04N 21/234327
  See application file for complete search history.

(56) References Cited

U.S. PATENT DOCUMENTS

| | | | |
|---|---|---|---|
| 6,937,596 B2 | 8/2005 | Sjolund et al. | |
| 7,151,753 B2 | 12/2006 | Chaney et al. | |
| 7,184,415 B2* | 2/2007 | Chaney | H04L 12/1818 370/260 |
| 2002/0091834 A1 | 7/2002 | Isozu et al. | |
| 2002/0174434 A1* | 11/2002 | Lee | H04N 21/234327 725/74 |
| 2004/0131053 A1* | 7/2004 | Sjolund | H04M 7/1245 370/356 |
| 2004/0252683 A1* | 12/2004 | Kennedy | H04L 29/06 370/389 |
| 2006/0140151 A1* | 6/2006 | Dantu | H04W 80/10 370/331 |
| 2007/0115944 A1* | 5/2007 | Dantu | H04W 76/10 370/352 |
| 2008/0101347 A1* | 5/2008 | Kauhanen | H04L 29/06027 370/352 |
| 2012/0076002 A1* | 3/2012 | Ramsayer | H04L 65/104 370/241 |

FOREIGN PATENT DOCUMENTS

| | | |
|---|---|---|
| WO | 0111856 A1 | 2/2001 |
| WO | 01/65881 A1 | 9/2001 |

OTHER PUBLICATIONS

3rd Generation Partnership Project; Technical Specificaion Group Services and System Aspects; IP Multimedia Subsystem (IMS); Stage 2, Release 5, Mar. 2003.
R. Sparks: "draft-etf-sip-refer-04" internet Draft, May 14, 2002, XP000864167.
A. Vaha-Sipila; "RFC 2806. URLs for Telephone calls" Request for Comments, Apr. 2000, XP000864166.
Office Action dated Oct. 10, 2015, in connection with Chinese Patent Application No. 201210280041.1, 11 pgs.

\* cited by examiner

FIG. 1

FIG. 2

TELECOMMUNICATION SYSTEM WITH PACKET-SWITCHED-MULTIMEDIA-SESSION-TO-CIRCUIT-SWITCHED-CALL TRANSFERRAL

PRIORITY CLAIM

This application is a continuation of U.S. application Ser. No. 10/449,666 filed Jun. 2, 2003, now U.S. Pat. No. 7,751,415. The entire disclosure of the prior application, application Ser. No. 10/449,666 is considered part of the disclosure of this continuation application and is hereby incorporated by reference.

BACKGROUND

The invention relates to a telecommunication system comprising a packet-switched multimedia terminal coupled to a first node for packet-switched multimedia sessions and to a first server for exchanging multimedia signalling information for said packet-switched multimedia sessions and comprising a terminating unit coupled to a second node and to a second server.

Such a telecommunication system is for example a Universal Mobile Telecommunication System (UMTS) or 3G System (see UMTS Release 5 specificatie 23.228 standardised by 3GPP), with said packet-switched multimedia terminal for example being a packet-switched UMTS multimedia terminal etc., with said node for example being a 3G Serving General Packet Radio Service Support Node or 3G Serving GPRS Support Node or 3G SGSN and/or being a 3G Gateway General Packet Radio Service Support Node or 3G Gateway GPRS Support Node or 3G GGSN etc., with said server for example being an application server in combination with for example a Proxy Call State Control Function or P-CSCF and/or a Serving Call State Control Function or S-CSCF etc., and with said terminating unit for example being a packet-switched UMTS multimedia terminal or a personal multimedia computer etc.

In this telecommunication system, said packet-switched multimedia terminal is involved in a multimedia session for example comprising the exchange of audio and video with said terminating unit. This session goes on either until one of said packet-switched multimedia terminal and said terminating unit finishes the session, or until the packet-switched multimedia terminal experiences a continuation problem like for example getting out of reach of the 3G node without finding an other 3G node or a battery in the packet-switched multimedia terminal running low or extreme interference disturbing said session too much or running out of 3G credit etc.

The known telecommunication system is disadvantageous, inter alia, due to, in case of experiencing one or more continuation problems, interrupting the session. This is not user-friendly.

SUMMARY OF THE INVENTION

It is an object of the invention, inter alia, of providing a telecommunication system as defined in the preamble which is more user-friendly.

The telecommunication system according to the invention is characterised in that said telecommunication system comprises a gateway coupled to said first node and to said first server and to a switch, with said packet-switched multimedia terminal comprising a transmitter for transmitting a transferral message to said first server for transferring at least a part of at least one packet-switched multimedia session between said packet-switched multimedia terminal and said first node to a circuit-switched call between said gateway and a circuit-switched terminal via said switch.

In response to a detection of a continuation problem—and then either automatically or in response to a user action—and/or in response to a UMTS network instruction, said transferral message is transmitted from said packet-switched multimedia terminal to said server and said (part of) at least one packet-switched multimedia session between said packet-switched multimedia terminal and said first node is transferred to a circuit-switched call between said gateway and the circuit-switched terminal via said switch. Said gateway is further coupled to said terminating unit via said second node. As a result, said packet-switched multimedia session between said terminating unit and said packet-switched multimedia terminal is at least partly transferred to said circuit-switched call between said terminating unit and said circuit-switched terminal, and the continuation problem is solved. The user of said packet-switched multimedia terminal just needs to pick up said circuit-switched call at said circuit-switched terminal, which is for example a GSM terminal or a PSTN/ISDN terminal or a personal computer etc.

The invention is based upon an insight, inter alia, that said continuation problems are non-abrupt processes, and is based upon a basic idea, inter alia, that before these processes have gone to an end, it is possible to send a message for creating an at least partly alternative communication path.

The invention solves the problem, inter alia, of providing a more user-friendly telecommunication system, and is advantageous, inter alia, in that an at least partly alternative communication path is offered to said user.

A first embodiment of the telecommunication system according to the invention as defined in claim 2 is advantageous in that said server comprises a receiver for receiving said transferral message and a transmitter for in response to said receiving transmitting an invitation message to said gateway.

In response to said receiving of said transferral message, said invitation message is transmitted from the server to the gateway, for activating the partly alternative communication path.

A second embodiment of the telecommunication system according to the invention as defined in claim 3 is advantageous in that said gateway comprises a receiver for receiving said invitation message and a transmitter for in response to said receiving transmitting a setup message to said switch for setting up said circuit-switched call.

In response to said receiving of said invitation message, said setup message is transmitted from the gateway to the switch for setting up the circuit-switched call corresponding via said at least partly alternative communication path.

A third embodiment of the telecommunication system according to the invention as defined in claim 4 is advantageous in that said server comprises said transmitter for in response to said receiving transmitting an information message to said terminating unit, which comprises a receiver for receiving said information message for bringing said terminating unit from session level to call level.

In response to said receiving of said information message, said terminating unit is informed of the change from old communication path (between the packet-switched multimedia terminal and the node) to new communication path (between the circuit-switched terminal and the gateway via the switch) with said terminating unit being coupled to said gateway via said second node, and said terminating unit may for example generate information via its man-machine-interface about this change. Further, said terminating unit when having operated at multimedia session level (for example comprising the exchange of audio and video) brings itself to call level (for example comprising the exchange of just audio), due to said circuit-switched terminal not being able to operate at multimedia session level.

A fourth embodiment of the telecommunication system according to the invention as defined in claim 5 is advantageous in that said transferral message is a Session Initiation Protocol REFER message comprising a predefined Uniform Resource Locator, with said server comprising a converter for converting said predefined Uniform Resource Locator into a call number defining said circuit-switched terminal.

Said Session Initiation Protocol REFER message is defined in drafts like the SIP RFC and the SIP REFER draft as standardised by IETF. Said predefined Uniform Resource Locator or URL firstly defines the service offered to said user and secondly solves the problem of packet-switched multimedia terminals usually not knowing their own call number like for example the Mobile Subscriber Integrated Service Digital Network number or MSISDN number.

A fifth embodiment of the telecommunication system according to the invention as defined in claim 6 is advantageous in that said packet-switched multimedia terminal and said circuit-switched terminal form part of one terminal.

By creating one terminal having a packet-switched multimedia mode and a circuit-switched mode, said user does not have to go far for said partly alternative communication path. For example when getting out of reach in the packet-switched multimedia mode, the circuit-switched mode will be a good alternative, although offering less possibilities (like offering just audio instead of offering audio as well as video), compared to offering no services at all.

Preferably, said packet-switched multimedia terminal comprises a first detector for detecting arising obstacles—such as a UMTS network instruction to leave the UMTS packet-switched multimedia network and to switch to a neighbouring 2G or 2.5G network—which indicate upcoming problems to continue the packet-switched multimedia connection, and a processor for generating, based upon said first detection, a transferal message with a predefined URL that identifies how the user can be reached in said 2G or 2.5G network to which said UMTS network instruction referred to.

Preferably, said packet-switched multimedia terminal comprises a second detector for detecting the circuit-switched call originating from the same terminating unit as the one involved in the packet-switched multimedia session or for detecting the same terminating unit being involved in the circuit-switched call as the one involved in the packet-switched multimedia session and comprises a switch for automatically switching the packet-switched multimedia terminal from packet-switched-multimedia-session-mode to circuit-switched-call-mode. The advantage of said (automatic) switch is that the communication is smoothlessly transferred from packet-switched-multimedia-session-mode to circuit-switched-call-mode without requiring any user interaction to accomplish this service continuity.

The invention further relates to a server for use in a telecommunication system comprising a packet-switched multimedia terminal coupled to a first node for packet-switched multimedia sessions and to said server for exchanging multimedia signalling information for said packet-switched multimedia sessions and comprising a terminating unit coupled to a second node and to a further server.

The server according to the invention is characterised in that said telecommunication system comprises a gateway coupled to said first node and to said server and to a switch, with said packet-switched multimedia terminal comprising a transmitter for transmitting a transferral message to said server for transferring at least a part of at least one packet-switched multimedia session between said packet-switched multimedia terminal and said first node to a circuit-switched call between said gateway and a circuit-switched terminal via said switch, and with said server comprising a receiver for receiving said transferral message and a transmitter for in response to said receiving transmitting an invitation message to said gateway.

Embodiments of the server according to the invention correspond with the embodiments of the telecommunication system according to the invention.

The invention yet further relates to a packet-switched multimedia terminal for use in a telecommunication system comprising said packet-switched multimedia terminal coupled to a first node for packet-switched multimedia sessions and to a first server for exchanging multimedia signalling information for said packet-switched multimedia sessions and comprising a terminating unit coupled to a second node and to a second server.

The packet-switched multimedia terminal according to the invention is characterised in that said telecommunication system comprises a gateway coupled to said first node and to said first server and to a switch, with said packet-switched multimedia terminal comprising a transmitter for transmitting a transferral message to said first server for transferring at least a part of at least one packet-switched multimedia session between said packet-switched multimedia terminal and said first node to a circuit-switched call between said gateway and a circuit-switched terminal via said switch.

Embodiments of the packet-switched multimedia terminal according to the invention correspond with the embodiments of the telecommunication system according to the invention.

The invention also relates to a gateway for use in a telecommunication system comprising a packet-switched multimedia terminal coupled to a first node for packet-switched multimedia sessions and to a first server for exchanging multimedia signalling information for said packet-switched multimedia sessions and comprising a terminating unit coupled to a second node and to a second server.

The gateway according to the invention is characterised in that said telecommunication system comprises said gateway coupled to said first node and to said first server and to a switch, with said at least one packet-switched multimedia terminal comprising a transmitter for transmitting a transferral message to said first server for transferring at least a part of at least one packet-switched multimedia session between said packet-switched multimedia terminal and said first node to a circuit-switched call between said gateway and a circuit-switched terminal via said switch, and with said gateway comprising a receiver for receiving said invitation message and a transmitter for in response to said receiving transmitting a setup message to said switch for setting up said circuit-switched call.

Embodiments of the gateway according to the invention correspond with the embodiments of the telecommunication system according to the invention.

The invention yet also relates to a terminating unit for use in a telecommunication system comprising a packet-switched multimedia terminal coupled to a first node for packet-switched multimedia sessions and to a first server for exchanging multimedia signalling information for said packet-switched multimedia sessions and comprising said terminating unit coupled to a second node and to a second server.

The terminating unit according to the invention is characterised in that said telecommunication system comprises a gateway coupled to said first node and to said first server and to a switch, with said packet-switched multimedia terminal comprising a transmitter for transmitting a transferral message to said first server for transferring at least a part of at least one packet-switched multimedia session between said packet-switched multimedia terminal and said first node to a circuit-switched call between said gateway and a circuit-switched terminal via said switch, and with said first server comprising a receiver for receiving said transferral message and a transmitter for in response to said receiving transmitting an information message to said terminating unit, which comprises a receiver for receiving said information message for bringing said terminating unit from session level to call level.

The invention further also relates to a method for use in a telecommunication system comprising a packet-switched multimedia terminal coupled to a first node for packet-switched multimedia sessions and to a first server for exchanging multimedia signalling information for said packet-switched multimedia sessions and comprising a terminating unit coupled to a second node and to a second server.

The method according to the invention is characterised in that said telecommunication system comprises a gateway coupled to said first node and to said first server and to a switch, with said method comprising the step of transmitting a transferral message from said packet-switched multimedia terminal to said first server for transferring at least a part of at least one packet-switched multimedia session between said packet-switched multimedia terminal and said first node to a circuit-switched call between said gateway and a circuit-switched terminal via said switch.

Embodiments of the method according to the invention correspond with the embodiments of the telecommunication system according to the invention.

The invention yet further also relates to a service for offering a user a transferral of at least a part of at least one packet-switched multimedia session between a packet-switched multimedia terminal and a first node to a circuit-switched call between a gateway and a circuit-switched terminal via a switch for use in a telecommunication system comprising said packet-switched multimedia terminal coupled to said first node for packet-switched multimedia sessions and to a first server for exchanging signalling information for said packet-switched multimedia sessions and comprising a terminating unit coupled to a second node and to a second server.

The service according to the invention is characterised in that said telecommunication system comprises a gateway coupled to said first node and to said first server and to a switch, with said packet-switched multimedia terminal comprising a transmitter for transmitting a transferral message to said first server for transferring at least a part of at least one packet-switched multimedia session between said packet-switched multimedia terminal and said first node to a circuit-switched call between said gateway and said circuit-switched terminal via said switch, with said transferral message being a Session Initiation Protocol REFER message comprising a predefined Uniform Resource Locator defining said service, with said first server comprising a converter for converting said predefined Uniform Resource Locator into a call number defining said circuit-switched terminal.

Embodiments of the service according to the invention correspond with the embodiments of the telecommunication system according to the invention. The service for example corresponds with a method of doing business.

The fact that a part X and a part Y are coupled to each other does not exclude that there exists a part Z located between both parts X and Y, and does not say anything about the coupling itself: this coupling can be (partly) a wireless and/or (partly) a wired coupling, can be (partly) packet-switched and/or (partly) circuit-switched, can be always-on or be required to be set up and to be finished etc.

These and other aspects of the invention will be apparent from and elucidated with reference to the embodiments(s) described hereinafter.

DETAILED DESCRIPTION

Figure 1:
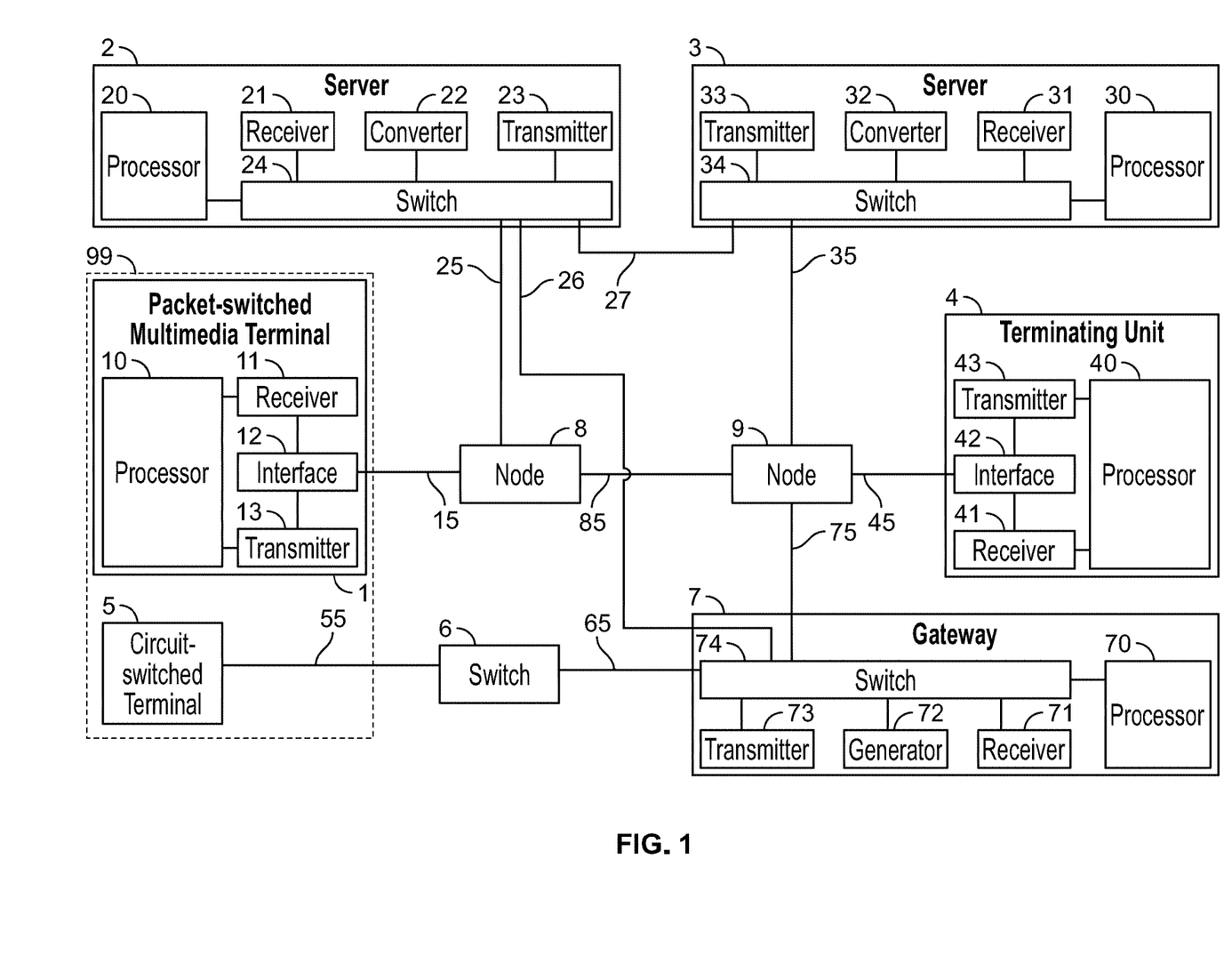
FIG. 1 illustrates in block diagram form a telecommunication system according to the invention comprising a server according to the invention and a packet-switched multimedia terminal according to the invention and a gateway according to the invention and a terminating unit according to the invention.

The telecommunication system according to the invention shown in FIG. 1 comprises a packet-switched multimedia terminal 1 according to the invention and a server 2,3 according to the invention and a gateway 7 according to the invention and a terminating unit 4 according to the invention. Packet-switched multimedia terminal 1 comprises a processor 10 coupled to an output of a receiver 11 and to an input of a transmitter 13 and comprises an interface 12 coupled to an input of receiver 11 and an output of transmitter 13 and coupled to coupling 15.

Server 2 (3) comprises a processor 20 (30) coupled to a switch 24 (34) which is further coupled to a receiver 21 (31), a converter 22 (32), a transmitter 23 (33) and to couplings 25 (35), 26 (–) and 27 (27).

Gateway 7 comprises a processor 70 coupled to a switch 74 which is further coupled to a receiver 71, a generator 72, a transmitter 73 and to couplings 26 and 65 and 75.

Terminating unit 4 comprises a processor 40 coupled to an output of a receiver 41 and to an input of a transmitter 43 and comprises an interface 42 coupled to an input of receiver 41 and an output of transmitter 43 and coupled to coupling 45.

A node 8 is coupled to couplings 15, 25 and 85, a node 9 is coupled to couplings 35, 45, 75 and 85, terminating unit 4 is coupled to coupling 45, a switch 6 is coupled to couplings 55 and 65, and a circuit-switched terminal 5 is coupled to coupling 55.

The telecommunication system shown in FIG. 1 is for example a Universal Mobile Telecommunication System (UMTS) or 3G System (see UMTS Release 5 specificatie 23.228 standardised by 3GPP), with packet-switched multimedia terminal 1 for example being a packet-switched UMTS multimedia terminal (in which case coupling 15 is a packet-switched multimedia mobile connection) etc., with nodes 8 and 9 for example being 3G Serving General Packet Radio Service Support Nodes or 3G Serving GPRS Support Nodes or 3G SGSNs and/or being 3G Gateway General Packet Radio Service Support Nodes or 3G Gateway GPRS Support Nodes or 3G GGSNs etc., with servers 2 and 3 respectively serving packet-switched multimedia terminal 1 and terminating unit 4 respectively and for example being application servers in combination with for example Proxy Call State Control Functions or P-CSCFs and/or Serving Call State Control Functions or S-CSCFs (and therewith comprising SIP) etc., and with terminating unit 4 for example being a UMTS terminal or 3G terminal (in which case coupling 45 is a packet-switched multimedia mobile connection) or a personal multimedia computer (in which case coupling 45 is PSTN/ISDN connection) etc., and functions as follows.

A user operating packet-switched multimedia terminal 1 is involved in a (UMTS or 3G) multimedia session for example comprising the exchange of audio and video with terminating unit 4. During this multimedia session, it becomes clear that there will be a continuation problem like for example getting out of reach of the 3G node 8 without finding an other 3G node or a battery in the packet-switched multimedia terminal 1 running low or extreme interference disturbing said session too much or running out of 3G credit etc.

In response to a detection of a continuation problem— either automatically or in response to a user action—and/or in response to a UMTS network instruction, a transferral message is transmitted from transmitter 13 in packet-switched multimedia terminal 1 via coupling 15 and node 8 and coupling 25 and switch 24 to receiver 21 in server 2. Said transferral message is a Session Initiation Protocol REFER message comprising a predefined Uniform Resource Locator. Said predefined Uniform Resource Locator or URL firstly defines the service offered to said user and secondly solves the problem of packet-switched multimedia terminals usually not knowing their own call number like for example the Mobile Subscriber Integrated Service Digital Network number or MSISDN number. Processor 20 is informed of this arrival, and instructs converter 22 to convert said predefined Uniform Resource Locator into a call number defining circuit-switched terminal 5, and instructs transmitter 23 to transmit an invitation message via switch 24 and coupling 26 to gateway 7. Gateway 7 comprises or is combined with a Media Gateway or MG and/or a Media Gateway Control Function or MGCF and/or a Breakout Gateway Control Function or BGCF. In gateway 7, this invitation message arrives via switch 74 at receiver 71, and processor 70 is informed, which instructs generator 72 to generate a setup message and instructs transmitter 73 to transmit this setup message via switch 74 and coupling 65 to switch 6, which switch 6 in response to this setup message sets up a circuit-switched call to said circuit-switched terminal 5.

As a result, said packet-switched multimedia session is at least partly transferred to said circuit-switched call, and the continuation problem is solved. The user of said packet-switched multimedia terminal 1 just needs to pick up said circuit-switched call at said circuit-switched terminal 5, which is for example a GSM terminal (in which case coupling 55 is a circuit-switched mobile connection or GSM connection and switch 6 is a Mobile Switching Center or MSC) or a PSTN/ISDN terminal (in which case coupling 55 is a PSTN/ISDN connection) or a personal computer (in which case coupling 55 is a PSTN/ISDN connection) etc.

Transmitter 23 further gets instructions from processor 20 to transmit an information message via switch 24 and coupling 27 and switch 34 and coupling 35 and node 9 to terminating unit 4, which comprises a receiver 41 for receiving said information message for bringing said terminating unit 4 from multimedia session level to call level. By receiving said information message, terminating unit 4 is informed of the change from old communication path (between packet-switched multimedia terminal 1 and node 9) to new communication path (between circuit-switched terminal 5 and gateway 7 via switch 6). Terminating unit 4 does not get to know the complete route, terminating unit 4 is informed about the transferral and receives a new SDP (Session Description Protocol) comprising the new session/media description and the IP address of the Media Gateway or MG to which future data is to be sent. Terminating unit 4 is coupled to gateway 7 via said node 9, and terminating unit 4 may for example generate information via its man-machine-interface about this change. Terminating unit 4 brings itself, when having operated at multimedia session level (for example comprising the exchange of audio and video), to call level (for example comprising the exchange of just audio), by for example not cutting off and/or not deleting audio related signals and cutting off and/or deleting video related signals, due to circuit-switched terminal 5 not being able to handle video related signals (not being able to operate at multimedia session level) but just being able to handle audio related signals (just being able to operate at call level).

Packet-switched multimedia terminal 1 and circuit-switched terminal 5 may form part of one terminal 99, then this one terminal 99 will have a packet-switched multimedia mode and a circuit-switched mode, and said user does not have to go far for using the partly alternative communication path. For example when getting out of reach in the packet-switched multimedia mode, the circuit-switched mode will be a good alternative, although offering less possibilities (like offering just audio instead of offering audio as well as video), compared to offering nothing at all.

Preferably, said packet-switched multimedia terminal comprises a first detector for detecting arising obstacles—such as a UMTS network instruction to leave the UMTS packet-switched multimedia network and to switch to a neighbouring 2G or 2.5G network—which indicate upcoming problems to continue the packet-switched multimedia connection, and a processor for generating, based upon said first detection, a transferral message with a predefined URL that identifies how the user can be reached in said 2G or 2.5G network to which said UMTS network instruction referred to.

Preferably, said packet-switched multimedia terminal 1,99 comprises a second detector for detecting the circuit-switched call originating from the same terminating unit 4 as the one involved in the packet-switched multimedia session or for detecting the same terminating unit 4 being involved in the circuit-switched call as the one involved in the packet-switched multimedia session and comprises a switch for automatically switching the packet-switched multimedia terminal 1,99 from packet-switched-multimedia-session-mode to circuit-switched-call-mode. The advantage of said (automatic) switch is that the communication is smoothlessly transferred from packet-switched-multimedia-session-mode to circuit-switched-call-mode without requiring any user interaction to accomplish this service continuity.

Possibly, said packet-switched multimedia terminal 1,99 comprises a third detector for detecting the getting out of reach of the 3G node 8 without finding an other 3G node or the battery in the packet-switched multimedia terminal 1 running low or the extreme interference disturbing said session too much etc., and/or said server 2,3 and/or said node 8,9 comprise a fourth detector for detecting the getting out of reach of the 3G node 8 without finding an other 3G node or the battery in the packet-switched multimedia terminal 1 running low or the extreme interference disturbing said session too much or the running out of 3G credit etc., in response to which detection said server 2,3 and/or said node 8,9 (comprising a UMTS network instruction generator) will generate said UMTS network instruction to be sent to packet-switched multimedia terminal 1,99 preferably comprising said first detector etc.

The invention is based upon an insight, inter alia, that said continuation problems are non-abrupt processes, and is based upon a basic idea, inter alia, that before these processes have gone to an end, it is possible to send a message for creating an at least partly alternative communication path.

The invention is further more detailedly based upon an insight, inter alia, that when a terminal is experiencing problems to continue its ongoing packet-switched multimedia session, a server in the network is more suited than the packet-switched terminal itself to coordinate the transferral of the packet-switched multimedia session. The coordinating role of the server consists in first trying to setup the alternative communication path to the circuit-switched terminal, informing the terminating unit of the new characteristics—such as the SDP containing the new media/session description and the IP address of the Media Gateway to which terminating unit is requested to send future data—of the new transferred session, and finally releasing—after the packet-switched terminal has been switched from packet-switched multimedia to circuit-switched communication—all resources which where required for the multimedia communication between the packet-switched terminal and the network.

The invention solves the problem, inter alia, of providing a more user-friendly telecommunication system, and is advantageous, inter alia, in that an at least partly alternative communication path is offered to said user.

The telecommunication system shown in FIG. 1 is just an example. Many other embodiments will be possible without departing from the scope of the invention. For example each server 2,3 now comprising or being combined with for example Proxy Call State Control Functions or P-CSCFs and/or Serving Call State Control Functions or S-CSCFs etc. could be completely separated from these functions. For example each server being coupled to its own node 8,9 could be changed into being coupled to each node and/or into being coupled to switches which are further coupled to said nodes. For example gateway 7 being coupled to its own node 8 could be changed into being coupled to each node and/or into being coupled to one or more switches which are further coupled to one or more nodes. For example switches 24,34, 74 could be relocated from server 2,3 and gateway 7 to nodes 8,9 and/or to switches located between said servers 2,3 and gateway 7 on the one hand and said nodes 8,9 on the other hand.

Generally, signalling info will be exchanged between packet-switched multimedia terminal 1 and server 2, server 2 and server 3, and server 3 and terminating unit 4 at session level, in which case the packet-switched data will be exchanged between packet-switched multimedia terminal 1 and terminating unit 4 via nodes 8 and 9. For said transferring, signalling info will be exchanged between packet-switched multimedia terminal 1 and server 2, between server 2 and gateway 7 and switch 6 and circuit-switched terminal 5, and between server 2 and terminating unit 4 via server 3. After said transferring, circuit-switched data will be exchanged between circuit-switched terminal 5 and gateway 7 via switch 6, and either packet-switched data or circuit-switched data will be exchanged between terminating unit 4 and gateway 7 via node 9, with said packet-switched data however just comprising data used for said call and no longer comprising all data used for said multimedia session.

Figure 2:
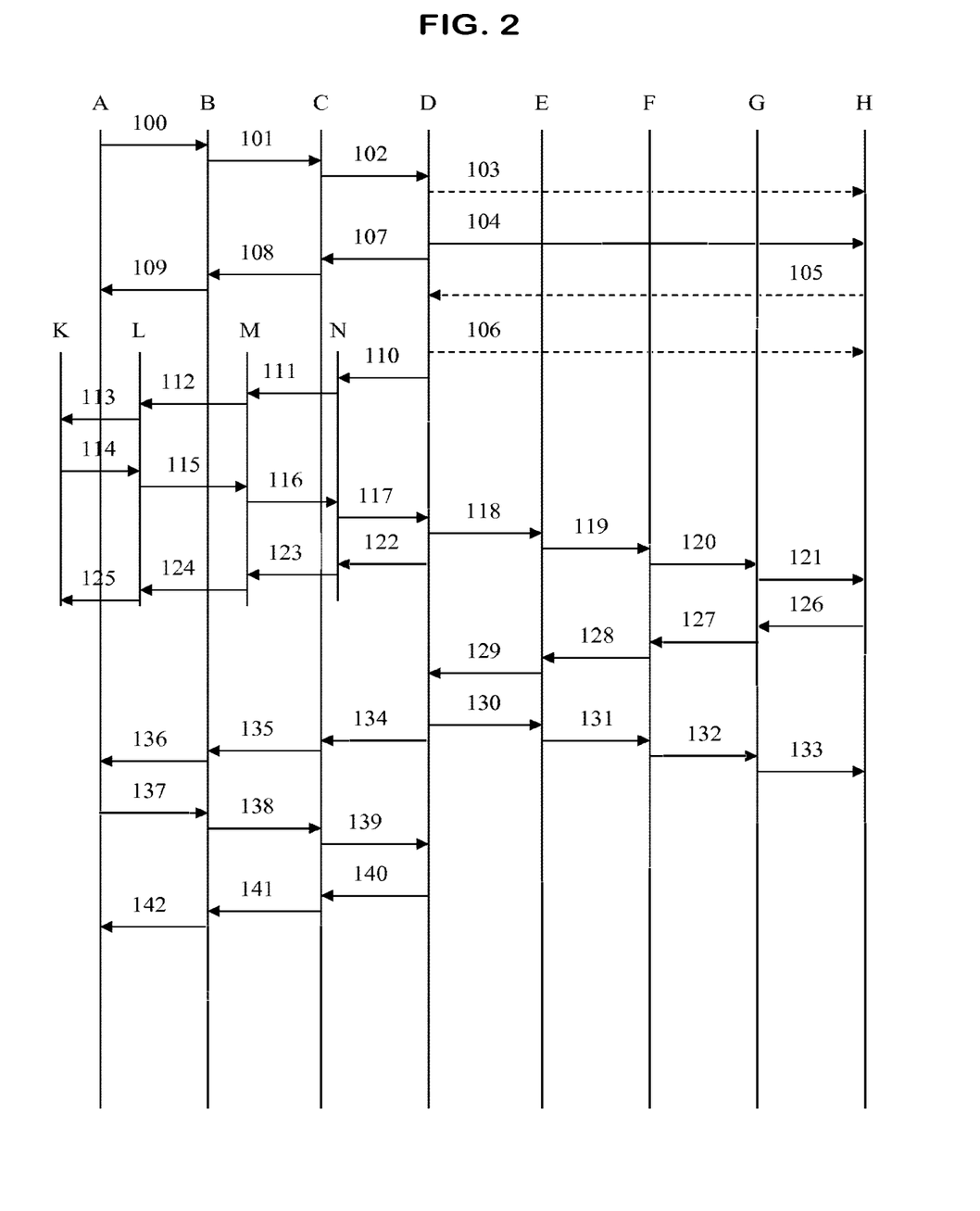
FIG. 2 illustrates in arrow diagram form a method according to the invention.

In FIG. 2, A-H and K-N have the following meaning: A=packet-switched multimedia terminal 1, B=P-CSCF 2, C=S-CSCF 2, D=server 2, E=S-CSCF 2, F=S-CSCF 3, G=P-CSCF 3, H=terminating unit 4, K=circuit-switched terminal 5, L=switch 6, M=MGCF 7, and N=BGCF 7. The arrows 100-142 have the following meaning:

100: Packet-switched multimedia terminal 1 sends a SIP REFER message to a predefined URL via P-CSCF2. Refer-To field is set to the predefined.

101: P-CSCF2 forwards the message to S-CSCF2.

102: S-CSCF2 performs service control. If packet-switched multimedia terminal 1 is not subscribed to the Refer service associated with the predefined URL, the request is rejected. Otherwise S-CSCF2 forwards the updated message to server 2 (application server that delivers the service associated with the predefined URL).

104: Server 2 makes sure—possibly by inserting a Media Resource Function MRF—a "service continuity/handover" announcement is played to terminating unit 4.

107: SIP 202 ACCEPT. Server 2 agrees to do the Refer as requested by packet-switched multimedia terminal 1 and confirms this with a SIP 202 Accept message to packet-switched multimedia terminal 1 in IMS (IP Multimedia Subsystem). This 202 accept message is sent through S-CSCF2, P-CSCF2 to packet-switched multimedia terminal 1. As soon as possible packet-switched multimedia terminal 1 releases User Plane PDP (GPRS Packet Data Protocol) contexts associated with the old IMS (IP Multimedia Subsystem) session.

108: SIP 202 ACCEPT, see 107.

109: SIP 202 ACCEPT, see 107.

110: Server 2 translates the predefined URL into the MSISDN of the circuit-switched terminal 5. The use of a pre-defined URL avoids the packet-switched multimedia terminal 1 having to know its MSISDN and then eases the procedure as the object of the REFER sent by the packet-switched multimedia terminal 1 can be hard-coded in its SW. Furthermore if packet-switched multimedia terminal 1 changes of MSISDN, the new call towards circuit-switched terminal 5 does not need to go through Number portability procedures as the correct MSISDN is provided automatically by server 2. After determination that the break out to the circuit-switched domain is to happen, server 2 sends INVITE message to BGCF.

111: BGCF selects appropriate MGCF and forwards INVITE message to it.

112: MGCF sets up a call using the MSISDN number of packet-switched multimedia terminal 1.

113: Switch 6 calls circuit-switched terminal 4 using standard GSM procedures.

114: Circuit-switched terminal 4 answers the call using standard GSM procedures.

115: Switch 6 confirms that communication with circuit-switched terminal 5 in GSM domains has been successfully established.

116: MGCF forwards this confirmation using SIP 200 OK final response to BGCF. In attachment to the SIP 200 OK MGCF adds an SDP (Session Description Protocol) containing the IP address of the gateway 7.

117: BGCF forwards 200 OK final response to server 2.

118: Server 2 sends SIP re-invite message to terminating unit 4 with in attachment an SDP (Session Description Protocol) containing the IP address of the gateway 7 extracted from 200 OK confirmation. Terminating unit 4 should send all data to the IP address of this gateway 7 to reach circuit-switched terminal 5. Server 2 stops service continuity/handover announcement playing. The message passes through S-CSCF2, S-CSCF3, P-CSCF3 up to terminating unit 4.

119: SIP re-invite: See 118.

120: SIP re-invite: See 118.

121: SIP re-invite: See 118.

122: SIP ACK.

123: SIP ACK.

124: ISUP ANS.

125: Ready

126: SIP 200 OK. Terminating unit 4 confirms the new destination address and starts sending data.

127: SIP 200 OK. See 126.

128: SIP 200 OK. See 126.

129: SIP 200 OK. See 126.

130: SIP ACK.

131: SIP ACK.

132: SIP ACK.

133: SIP ACK.

134: SIP BYE. Server 2 clears the original session sending SIP BYE message. This message is sent through S-CSCF2, P-CSCF2 up to packet-switched multimedia terminal 1.

135: SIP BYE. See 134.

136: SIP BYE. See 134.

137: SIP 200 OK. If BYE was received (if packet-switched multimedia terminal 1 is still under IMS/UMTS coverage), packet-switched multimedia terminal 1 may acknowledge the BYE by sending 200 OK to server 2 and server 2 will acknowledge the 200 OK with an ACK message. These messages are sent through P-CSCF2 and S-CSCF2.

138: SIP 200 OK. See 137.

139: SIP 200 OK. See 137.

140: SIP ACK. See 137.

141: SIP ACK. See 137.

142: SIP ACK. See 137.

Each arrow 100-142 could be regarded to be a substep of the method according to the invention and/or a subpart of the service according to the invention. Further substeps and/or subparts are not to be excluded, like for example substeps/subparts 103, 105 and 106 (to be defined in the future and possibly defining the tearing down of the non-audio components before setting up the alternative communication path alternatively to substeps/subparts 118-121 possibly defining the tearing down of the non-audio components after setting up the alternative communication path. Said method is characterised in that said method comprises the step of transmitting a transferral message from said packet-switched multimedia terminal (1) to said first server (2) for transferring at least a part of at least one packet-switched multimedia session between said packet-switched multimedia terminal (1) and said first node (8) to a circuit-switched call between said gateway (7) and a circuit-switched terminal (5) via said switch (6). Said service is characterised in that said transferral message being a Session Initiation Protocol REFER message comprising a predefined Uniform Resource Locator defining said service.

Generally, telecommunication systems with packet-switched multimedia terminals (1), nodes (8,9) for packet-switched multimedia sessions and servers (2,3) for exchanging signalling information for said packet-switched multimedia sessions and terminating units (4) are advantageously provided with gateways (7) for in response to transferral messages transferring packet-switched multimedia sessions between packet-switched multimedia terminals (1) and nodes (8,9) to circuit-switched calls between gateways (7) and circuit-switched terminals (5) via switches (6), to continue possibly interrupted sessions via so-called "replacing calls". Said servers (2,3) send invitation messages to gateways (7), which send setup messages to switches (6) for setting up circuit-switched calls via partly alternative communication paths (couplings 65 and 55 instead of couplings 15 and 85). Said servers (2,3) send information messages to terminating units (4) for bringing said terminating units (4) from session level to call level. Transferral messages are session Initiation Protocol REFER messages comprising predefined Uniform Resource Locators to be converted into call numbers defining circuit-switched terminals (5).

The invention claimed is:

1. A method comprising:

using, by a second terminal, session description protocol information for a multimedia internet protocol multimedia subsystem session with a first terminal, said multimedia internet protocol multimedia subsystem session initially ongoing on said first terminal as a packet-switched multimedia internet protocol multimedia subsystem session;

receiving, by the second terminal, new session description protocol information due to transferring at least partly said packet-switched multimedia internet protocol multimedia subsystem session to a circuit-switched call due to a handover of the first terminal; and using, by the second terminal, said new session description protocol information for continuing said multimedia internet protocol multimedia subsystem session with said first terminal.

2. The method according to claim 1, comprising:

receiving a session initiation protocol message including said new session description protocol information.

3. The method according to claim 2, wherein said session description protocol message comprises a Re-Invite message.

4. The method according to claim 1, wherein:

said new session description protocol information includes information of a new internet protocol address to which data is to be sent after said transfer.

5. The method according to claim 1, wherein:

said new session description protocol information includes information of new session description and/or information of new media description.

6. An apparatus comprising:

at least one processor; and at least one memory including computer program code;

the at least one memory and the computer program code configured to, with the at least one processor, cause the apparatus at least to perform:

sending towards a second terminal, a session initiation protocol message comprising new session description protocol information due to a transfer at least partly of a packet-switched multimedia internet protocol multimedia subsystem session to a circuit-switched call due to a handover of a first terminal, for continuing a multimedia internet protocol multimedia subsystem session between said second terminal and said first terminal, said multimedia internet protocol multimedia subsystem session initially ongoing on said first terminal as the packet-switched multimedia internet protocol multimedia subsystem session.

7. The apparatus according to claim 6, wherein said new session description protocol information includes information of a new internet protocol address to which data is to be sent by said second terminal after said transfer.

8. The apparatus according to claim 6, wherein said session initiation protocol message comprises a session initiation protocol re-invite message.

9. The apparatus according to claim 6, the at least one memory and the computer program code configured to, with the at least one processor, cause the apparatus at least to perform:
   transmitting a session initiation protocol message towards said first terminal for releasing resources that were required for said packet-switched multimedia internet protocol multimedia subsystem session.

10. The apparatus according to claim 9, wherein said session initiation protocol message comprises a session initiation protocol bye message.

11. The apparatus according to claim 6, wherein:
   said new session description protocol information includes information of new session description and/or information of new media description.

12. An apparatus comprising:
   at least one processor; and
   at least one memory including computer program code;
   the at least one memory and the computer code configured to, with the at least one processor, cause the apparatus at least to perform:
      using session description protocol information for a multimedia internet protocol multimedia subsystem session with a first terminal, said multimedia internet protocol multimedia subsystem session initially ongoing on said first terminal as a packet-switched multimedia internet protocol multimedia subsystem session;
      receiving new session description protocol information due to a transfer at least partly of said packet-switched multimedia internet protocol multimedia subsystem session to a circuit-switched call due to a handover of said first terminal; and
      using said new session description protocol information for continuing said multimedia internet protocol multimedia subsystem session with said first terminal.

13. The apparatus according to claim 12, wherein said new session description protocol information includes information of a new internet protocol address to which data is to be sent after said transfer.

14. The apparatus according to claim 12, wherein:
   said new session description protocol information includes information of new session description and/or information of new media description.

15. The apparatus according to claim 12, the at least one memory and the computer program code configured to, with the at least one processor, cause the apparatus at least to perform:
   receiving said new session description protocol information in a session initiation protocol message.

16. The apparatus according to claim 15, wherein said session initiation protocol message comprises a session initiation protocol re-invite message.

* * * * *